United States Patent
Lall et al.

(10) Patent No.: US 8,140,069 B1
(45) Date of Patent: Mar. 20, 2012

(54) SYSTEM AND METHOD FOR DETERMINING THE AUDIO FIDELITY OF CALLS MADE ON A CELLULAR NETWORK USING FRAME ERROR RATE AND PILOT SIGNAL STRENGTH

(75) Inventors: Abhishek Lall, Manhattan, KS (US); Ashish Bhan, Shawnee, KS (US); Sachin Vargantwar, Overland Park, KS (US); Robert Stedman, Raymore, MO (US); Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 948 days.

(21) Appl. No.: 12/138,068

(22) Filed: Jun. 12, 2008

(51) Int. Cl.
H04W 24/00 (2009.01)
H04B 17/00 (2006.01)
G10L 21/02 (2006.01)
G10L 11/00 (2006.01)
H04M 1/24 (2006.01)

(52) U.S. Cl. ............ 455/423; 455/67.11; 704/226; 704/236; 704/270; 379/1.03; 370/241

(58) Field of Classification Search ...... 455/67.11–67.7, 455/423–425; 704/226–228, 236, 270; 379/1.02–1.04
See application file for complete search history.

(56) References Cited

U.S. PATENT DOCUMENTS 6,240,124 B1 * 5/2001 Wiedeman et al. ........... 375/130
7,302,234 B1 * 11/2007 Fessler et al. ............... 455/67.13
7,327,985 B2 * 2/2008 Morfitt et al. ............... 455/67.11
7,437,128 B1 * 10/2008 Fessler et al. ............... 455/67.13
7,707,031 B2 * 4/2010 Saraby ........................... 704/228

FOREIGN PATENT DOCUMENTS

WO   WO 2006/093462 A1   9/2008

OTHER PUBLICATIONS

Ditech Networks, "Ditech Networks Introduces Experience Intelligence™ (EXi) Solution, Enabling Service Providers to Understand and Improve Voice Quality of Experience," http://www.ditechnetworks.com, printed Feb. 6, 2008.
Ditech Networks, "Experience Intelligence™ for Mobile and PSTN Networks," http://www.ditechnetworks.com, printed Feb. 6, 2008.
Ditech Networks, "16 Mobile Carriers Utilize Networks Exi Solution to Measure Voice Quality," http://www.ditechnetworks.com, printed Feb. 6, 2008.
Ditech Networks, "Limitations of PESQ for Measuring Voice Quality for Mobile and VoIP Networks Networks," http://www.ditechnetworks.com, printed Feb. 6, 2008.
"Polynomial/Trig Regression Data Fit," http://www.arachnoid.com/polysolve/index.html, printed May 21, 2008.

* cited by examiner

Primary Examiner — Matthew Sams

(57) ABSTRACT

The present invention provides a method and system for defining the mean opinion score (MOS) as a function of frame error rate (FER) and pilot signal strength. In an embodiment of the invention, an entity receives MOS scores that have been obtained using subjective tests for certain calls made within the network. Next, the entity receives FER and pilot signal strength samples that have been obtained for the calls for which MOS scores have been subjectively obtained. Finally, the entity calculates an equation for the MOS as a function of FER and pilot signal strength using a non-linear regression analysis.

20 Claims, 11 Drawing Sheets

SYSTEM AND METHOD FOR DETERMINING THE AUDIO FIDELITY OF CALLS MADE ON A CELLULAR NETWORK USING FRAME ERROR RATE AND PILOT SIGNAL STRENGTH

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased dramatically over recent years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instant, an access terminal in a wireless network will typically be positioned in a given physical sector and will be able to communicate with the transport network via the BTS serving that physical sector. In operation, a BTS typically emits a pilot signal on each sector, and a mobile station in receipt of a pilot signal regularly measures the strength ($E_c/I_o$, i.e., energy versus spectral density) of the pilot and notifies the cellular wireless network when the signal strength of the pilot falls above or below designated thresholds.

As the mobile station moves between wireless coverage areas of a wireless communication system, such as between cells or sectors, or when network conditions change or for other reasons, the mobile station may "hand off" from operating in one coverage area to operating in another coverage area. In a usual case, this handoff process is triggered by the mobile station monitoring the signal strength of various nearby available coverage areas, and the mobile station or the BSC (or other controlling network entity) determining when one or more threshold criteria are met. For instance, the mobile station may continuously monitor signal strength from various available sectors and notify the BSC when a given sector has a signal strength that is sufficiently higher than the sector in which the mobile station is currently operating. The BSC may then direct the mobile station to hand off to that other sector.

In some wireless communication systems or markets, a wireless service provider may implement more than one type of air interface protocol. For example, a carrier may support one or another version of CDMA, such as EIA/TIA/IS-2000 Rel. 0, or A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

In a typical wireless communication system, communications from a base station (or more specifically, the BTS) to an access terminal are carried on a "forward link" of the air interface, and communications from an access terminal to a base station are carried on a "reverse link" of the air interface. Data sent on both the forward and reverse links may be first assembled into units called frames, which are then encoded for transmission to or from the access terminal at regular intervals (corresponding to a frame rate), typically 20 milliseconds in duration (although other frame intervals can be used). As a result of imperfect transmission, some frames received by the mobile station on the forward link or by the base station on the reverse link may contain errors. Additionally frames may be lost, which can be inferred by the failure to receive a frame during one or more of the regular frame-rate intervals. Other frames—ideally, the majority of them—will be received without errors.

On either link, the receiving entity (e.g., a mobile station or base station) can compute a ratio of (i) the number of error-containing frames received during a given period of time to (ii) the total number of frames received during the same period of time. This ratio, computed by the mobile station on the forward link or by the base station on the reverse link, is called the frame error rate (FER). For either link, the FER is an indicator of the quality of service provided over the respective link. For instance, frame errors may manifest as lost audio samples, which in turn cause choppy or distorted audio output when played out by a receiving device. Similarly, frame errors may represent packet-data loss that may result in retransmissions and lower overall throughput. In general, the higher the FER, the lower the quality of service will be, and vice versa.

Cellular service providers may perform tests on calls made over the network to determine whether the audio fidelity of the calls are up to the service provider's standards. If the audio fidelity of the calls does not meet the service provider's standards, the service provider may repair and/or upgrade components within the network to increase the audio fidelity of the calls. Various methods exist to calculate the audio fidelity of a call over a cellular network. For example, the mean opinion score is a numerical measure for representing audio fidelity. The mean opinion score is expressed as a number in the range 1.0 to 5.0, where 1.0 is lowest perceived quality and 5.0 is the highest perceived quality. The mean opinion score for a call (or group of calls) is typically generated by averaging the results of a set of standard, subjective tests set forth in Recommendation P.800, Telecommunication Standardization Sector of ITU, Geneva, Switzerland, August, 1997, although other calculations for the mean opinion score could be utilized. These subjective tests generally require a person to listen to and rate the voice quality of a call over the cellular communications network. Because of the subjective nature of the tests, obtaining a mean opinion score for calls over a network can be time consuming and expensive.

OVERVIEW

The present invention provides a method and system to determine the mean opinion score of calls made within a network. In a first embodiment, the mean opinion score is determined using a non-linear regression analysis that defines the mean opinion score in an equation as a function of FER and pilot signal strength. In a second embodiment, the mean opinion score is determined using a linear regression analysis that defines the mean opinion score in an equation as a function of either FER or pilot signal strength. Thus, a cellular service provider may use either the linear or non-linear equation to calculate the audio fidelity of calls without having to conduct expensive, subjective tests.

In the first embodiment of the invention, an entity receives mean opinion scores that have been obtained using subjective tests for certain calls made within the network. Next, the entity receives FER and pilot signal strength samples that have been obtained for the calls for which mean opinion scores have been subjectively obtained. Finally, the entity calculates an equation for the mean opinion score as a function of FER and pilot signal strength using a non-linear regression analysis. After calculating the equation, mean opinion scores for calls can be determined without using a subjective test. In addition, if mean opinion scores within a sector fall below an acceptable limit, maintenance personnel may be dispatched quickly to repair the sector.

In the second embodiment of the invention, an entity receives mean opinion scores that have been obtained using subjective tests for certain calls made within the network. Next, the entity receives FER or pilot signal strength samples that have been obtained for the calls for which mean opinion scores have been subjectively obtained. Finally, the entity calculates an equation for the mean opinion score as a function of FER or pilot signal strength using a linear regression analysis. After calculating the equation, mean opinion scores for calls can be determined without using a subjective test. In addition, if mean opinion scores within a sector fall below an acceptable limit, maintenance personnel may be dispatched quickly to repair the sector.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
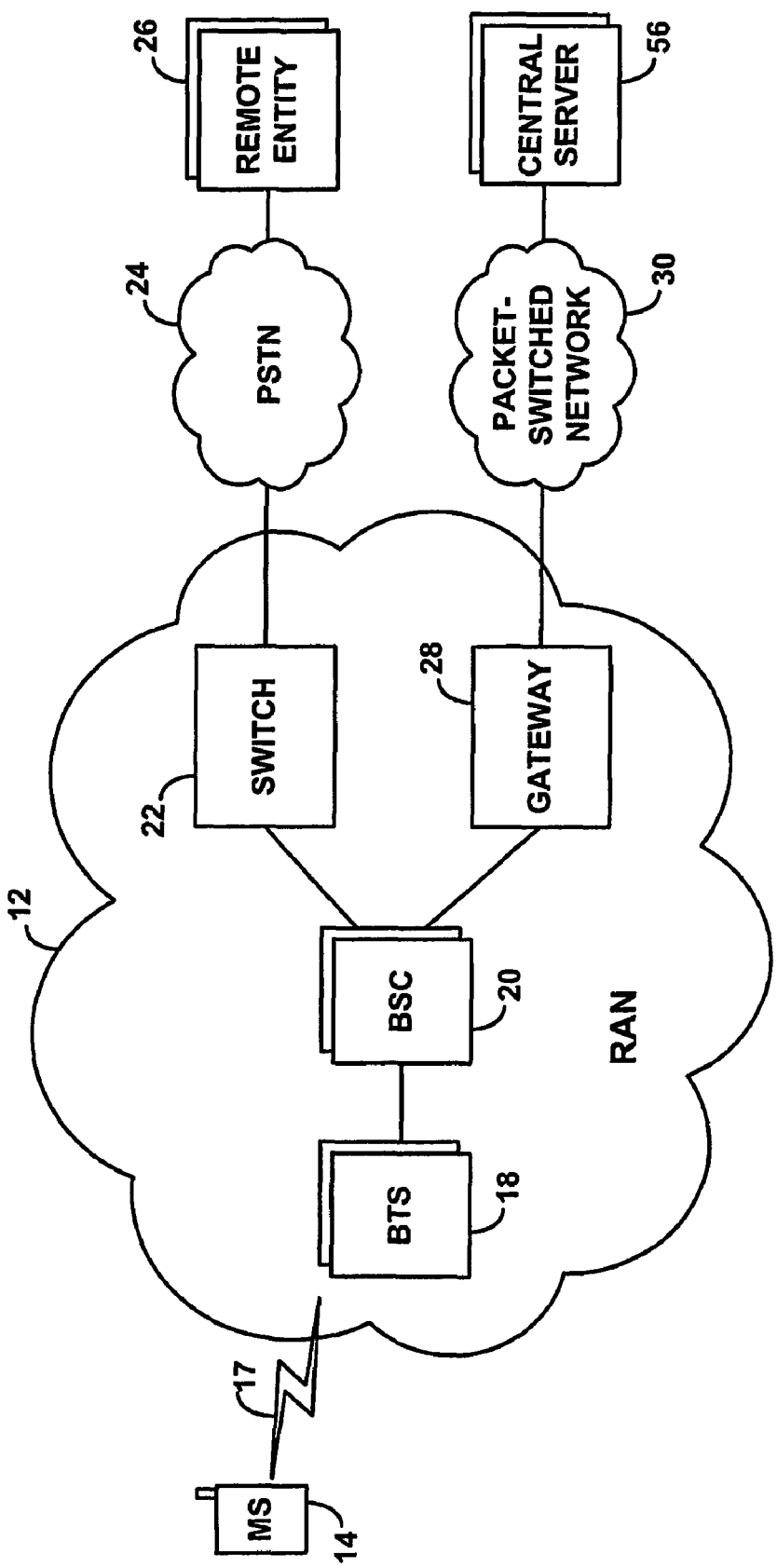
FIG. 1 is a simplified block diagram of a communication system for which an exemplary embodiment of the invention can be applied.

Referring to the drawings, FIG. 1 depicts a cellular communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts a representative mobile station 14, which could be a cell phone, wirelessly equipped personal data assistant (PDA), or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1x.RTT, 1xEV-DO, etc.), iDEN, WiMAX, TDMA, AMPS, GSM, GPRS, UMTS, EDGE, LTE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define example sector 17. The RAN may define this sector discretely through use of directional antennas and/or by various modulation parameters, including, without limitation, carrier frequencies and PN offsets or other parameters, depending on the air interface protocol used.

The RAN can take various forms and may include any of a variety and number of components, depending for instance on the air interface protocol employed by the RAN. For example, the RAN may include one or more BTSs 18 and one or more BSCs 20 (also sometimes referred to as radio network controllers (RNCs)). The BTSs preferably include directional antennas, power amplifiers, and associated transceiver equipment arranged to establish the sectors shown and to communicate with served mobile stations. BTS 18 emits a pilot signal on each sector, typically at a power level higher than other downlink signals. And each mobile station 14 regularly measures the strength of each pilot signal that it receives and notifies BSC 20, for instance, when the signal strength of a given pilot signal falls above or below designated thresholds. BSC 20, in turn, provides mobile station 14 with an updated list of active pilots.

In addition, BSC 20 may control one or more BTSs and may manage aspects of air interface operation. For instance, a BSC may manage assignment of air interface traffic channels to mobile stations in response to mobile station origination messages. Further, the BSC may manage handoff of mobile stations between sectors, by engaging in control channel signaling such as that described above.

Each BSC may be coupled with an MSC or other switch 22 that provides connectivity with the PSTN 24 if applicable, so that served mobile stations can communicate with remote entities 26 on the PTSN. And each BSC may be coupled with a packet data serving node (PDSN) or other gateway 28 that provides connectivity with a packet-switched network 30 if applicable, so that served mobile stations can communicate with central server 56 or other entities on the packet-switched network.

Figure 2:
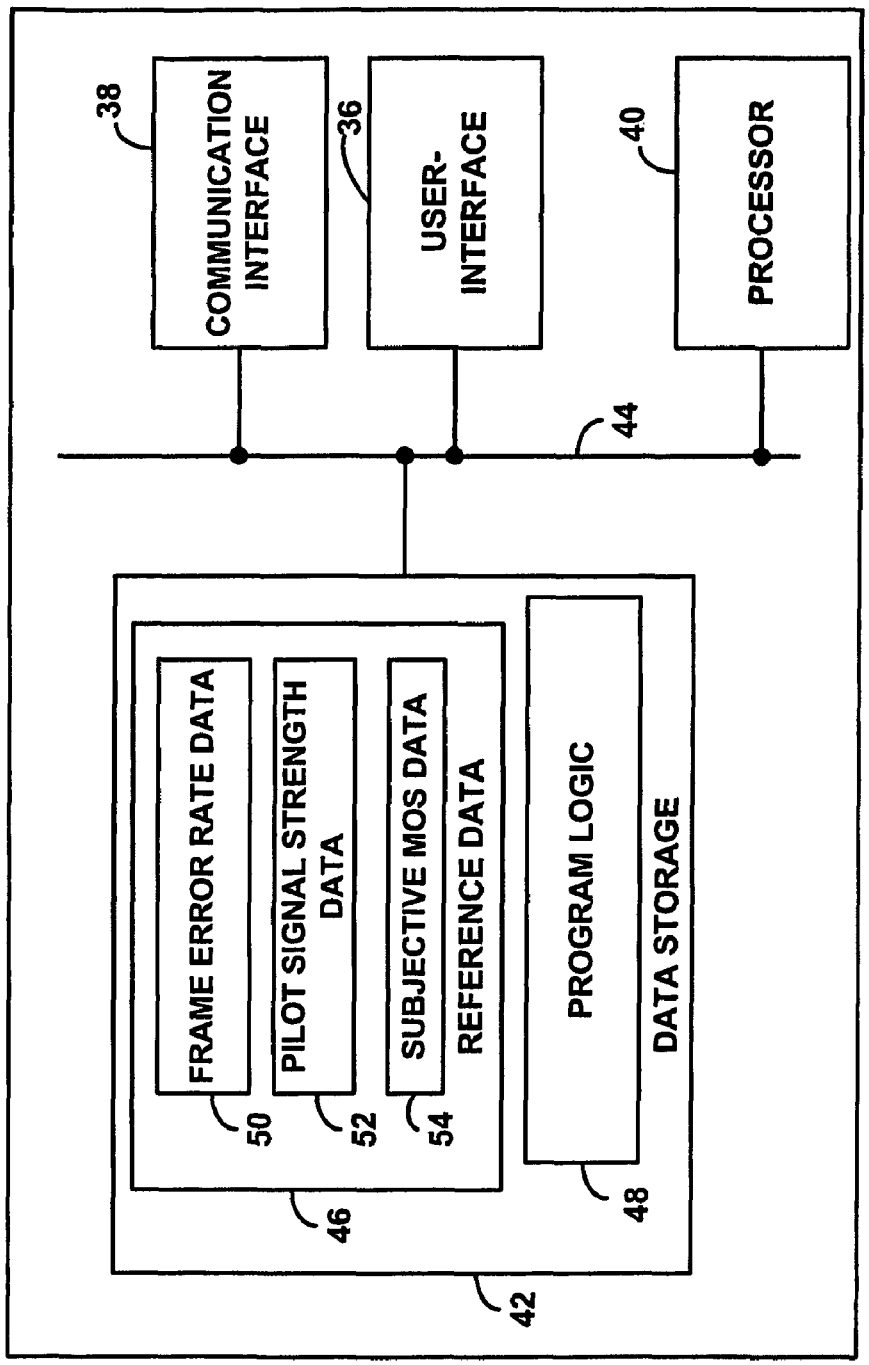
FIG. 2 is a simplified block diagram of an entity arranged to implement aspects of the exemplary embodiment.

Aspects of the present invention may be carried out by one or more entities shown in FIG. 1, or by one or more other entities. For instance, aspects may be carried out by mobile station 14, BTS 18, BSC 20, switch 22, and/or some other entity, such as central server 56, coupled with the various entities shown. FIG. 2 is a simplified block diagram depicting functional components of such an entity (e.g., combination of entities). As shown, the entity includes by way of example a user-interface 36, a communication interface 38, a processor 40, and data storage 42, coupled together by a system bus, network, or other connection mechanism 44.

User interface 36 comprises input and output components to facilitate user interaction with the entity. The user interface 36 may include a keypad or other mechanism to facilitate tactile user input. Communication interface 38 may include one or more communication interface mechanisms that enable the entity to communicate with various other entities. As such, the communication interface may take various well known forms, depending on factors such as the type of communication links in use. Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may be integrated in whole or in part with processor 40.

As shown, data storage 42 may hold reference data 46 and program logic 48. The reference data may comprise frame error rate data 50, pilot signal strength data 52, and subjective mean opinion score data 54. The program logic 48 may comprise machine language instructions executable by processor 40 to carry out various functions described herein.

Mobile station 14 may be configured to calculate frame error rates. For example, when mobile station 14 receives a frame, some or all of the bits in the frame may be unrecoverable, e.g., because the signal-to-noise ratio is too low. Mobile station 14 may identify such frames as error frames. Further, mobile station 14 may keep track of the number of error frames it encounters in order to determine an error level in its respective received signal. Thus, mobile station 14 may determine a forward-link error level in the forward link signal received by the mobile station.

The error levels that are determined by mobile station 14 could be, for example, frame error rates. A frame error rate may be characterized as the percentage of error frames within a certain number of frames. Mobile station 14 could report the calculated frame error rate to the BSC 20, central server 56 or some other entity. Alternatively, mobile station 14 may report the forward-link error level to the BSC 20, central server 56, or some other entity by transmitting a Power Measurement Report Message (PMRM). The PMRM could, for example, report the number of error frames encountered during a measurement interval, as well as the total number of frames in the measurement interval.

Mobile station 14 may also measure the signal strengths of pilot signals from a plurality of sectors. Mobile station 14 may transmit a Pilot Strength Measurement Message (PSMM) to BSC 20, central server 56, or some other entity.

The PSMM indicates the pilot signal strength for each sector as an $E_C/I_0$ value, wherein $E_C$ is the energy per chip and $I_0$ is the interference power density. It is to be understood, however, that the pilot signal strengths could be measured by the mobile station and/or reported in the PSMM in terms of parameters other than $E_C$ and $I_0$.

BSC 20 may be configured to receive a calculated forward-link frame error rate from the mobile station and to send that value on to the central server. BSC 20 may also be configured to receive a PMRM from the mobile station, to determine the forward-link frame error rate, and to send the forward-link frame error rate to central server 56, or some other entity. In addition, BSC 20 may determine a reverse-link error level in the reverse link signal, calculate the reverse-link frame error rate, and send the calculated frame error rate to central server 56. BSC 20 may also be configured to receive a PSMM message from the mobile station, and forward the PSMM message to central server 56, or some other entity.

Central server 56 may receive forward or reverse link frame error rate values from mobile station 14 or BSC 20, and to store those values in frame error rate data 50. Additionally, central server 56 may receive a PSMM message and store the PSMM message into pilot signal strength data 52. In addition, central server 56 may receive, via user-interface 36, for example, mean opinion scores obtained by a subjective test and store those scores in subjective mean opinion score data 54. Finally, the central server 56 may calculate an equation for mean opinion score as a function of FER and pilot signal strength. As discussed in more detail below, central server 56 may calculate the equation using a trigonometric regression model. Additionally or alternatively, the central server 56 may be configured to calculate an equation for mean opinion score as a function of FER or pilot signal strength. As discussed below, central server 56 may calculate the equation using a linear regression model.

Figure 3:
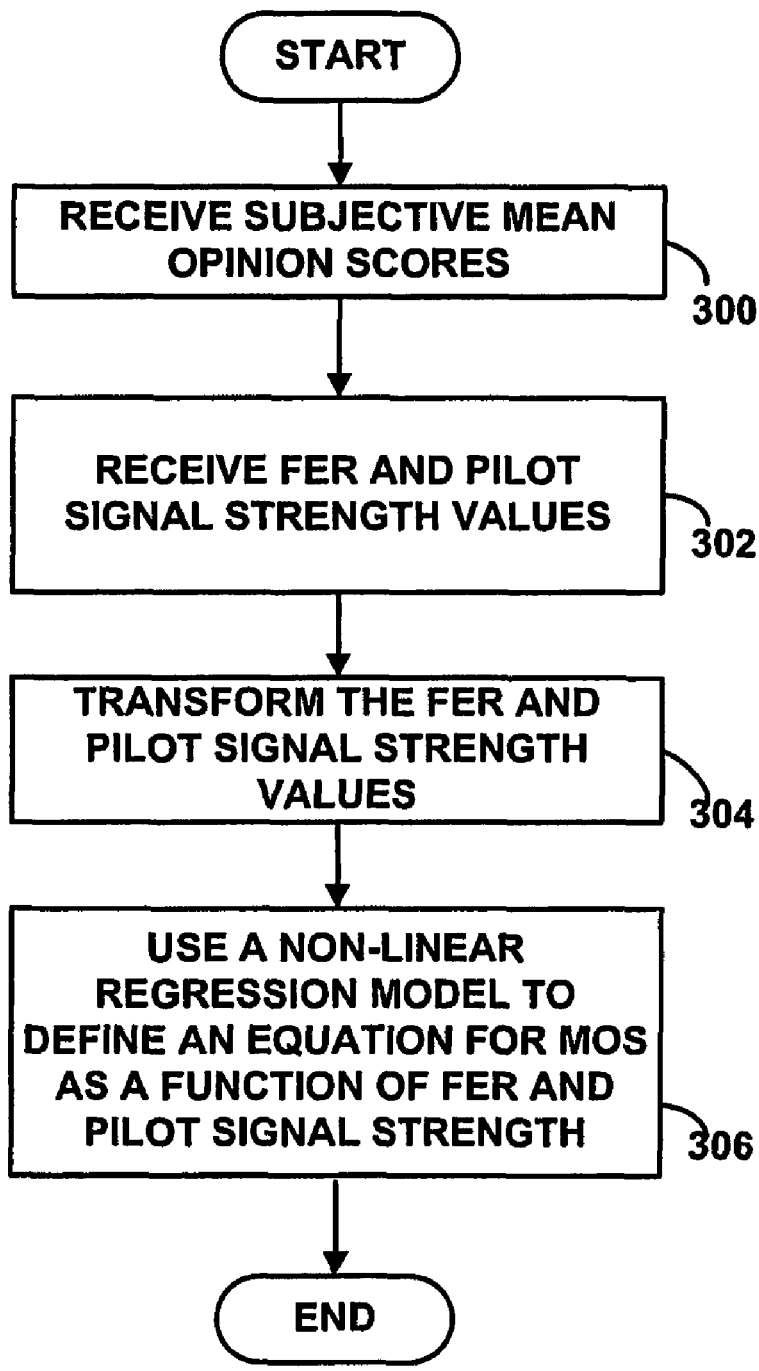
FIG. 3 is a flow chart depicting functions that can be carried out in accordance with the exemplary embodiment.

FIG. 3 is a flow chart depicting in summary a set of functions that can be carried out in accordance with an exemplary embodiment. Specifically, FIG. 3 depicts a method for calculating the mean opinion score as a function of FER and pilot signal strength. As noted above, aspects of the method may be carried out by an entity (e.g., combination of entities) such as a mobile station, a BSC, a centralized server, or some other entity.

As shown in FIG. 3, at step 300, the entity receives subjective mean opinion scores for calls made within the network (hereinafter referred to as "test calls"). As noted above, mean opinion scores are obtained using a subjective test that generally requires a person listen to a call and to assign a score from 1.0 to 5.0 to the call (or portions of the call), based on that person's perception of the audio fidelity of test phrases made during the call. The entity may receive the subjective mean opinion scores by receiving an input from user-interface 36. Alternatively, the entity could receive a message from another entity than via communication interface 38 that includes the subjective mean opinion scores.

At step 302, the entity receives FER and pilot signal strength values for the test calls. As discussed above, the entity could obtain the pilot signal strength values by receiving a message, such as a PSMM message, from mobile station 14 or BSC 20. The entity could obtain the FER values by receiving a message from BSC 20 that includes the calculated forward and reverse-link frame error rates. It should be understood that for each MOS call, there may be several FER and pilot signal strength values.

Figure 4:
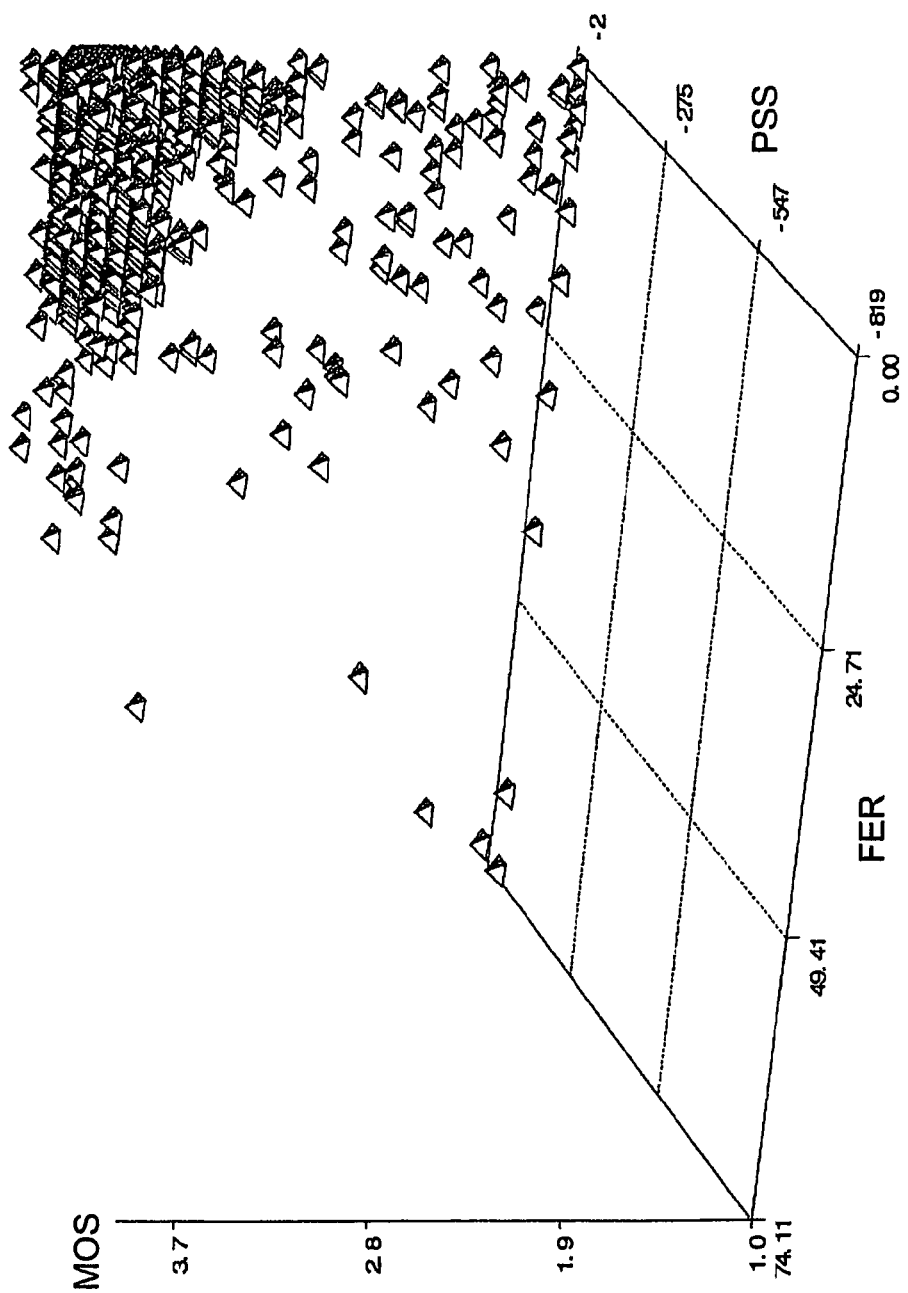
FIG. 4 is a three-dimensional plot depicting subjective mean opinion scores, FER values, and pilot signal strength values.

FIG. 4 is a three-dimensional plot depicting the received subjective mean opinion scores plotted against the received FER values and the received pilot signal strength values. As shown in FIG. 4, it is difficult to discern any pattern in the data.

At step 304, the entity applies a data transformation technique to the FER and pilot signal strength values in order to identify a pattern in the data. For example, the entity may employ a weighted means method to determine which pilot signal strength values and FER values are most likely to correspond to a discrete subjective mean opinion score. The weighted means method involves (1) creating a histogram of FER and pilot signal strength values for each mean opinion score, (2) using the histogram to determine proportional weights of the FER and pilot signal strength values, and (3) using the proportional weights to calculate the pilot signal strength values and FER values that most likely to correspond to a discrete mean opinion score.

Figure 5:
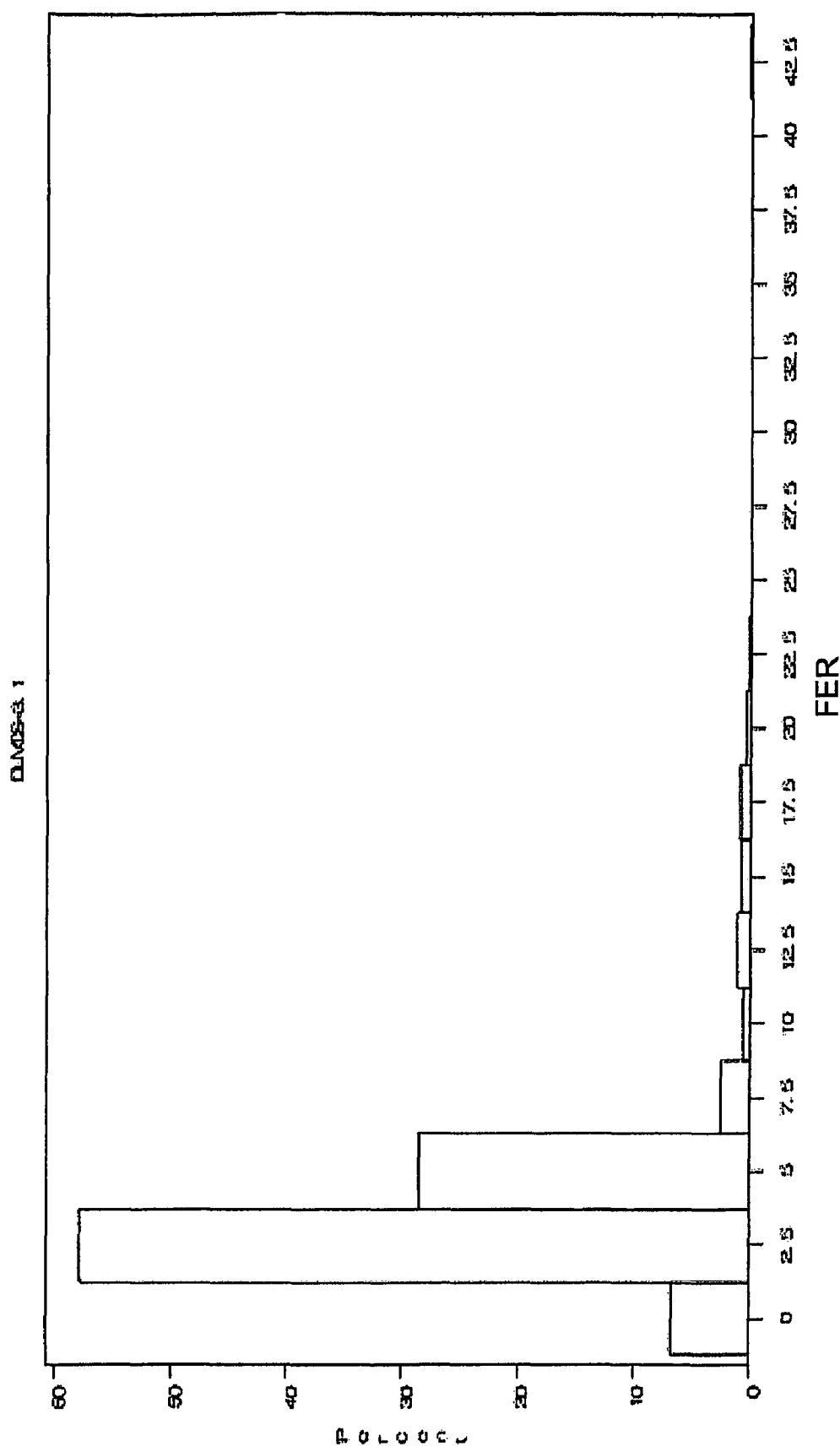
FIG. 5 is a histogram of FER values corresponding to a specific mean opinion score.

An example of a histogram used in the weighted means method is shown in FIG. 5. FIG. 5 depicts a histogram of FER values that correspond to a subjective mean opinion score of 3.1. The size of each interval in the histogram is 2.5, but other sizes may be used as well. As shown in FIG. 5, approximately 6.8% of the FER values that correspond to a mean opinion score of 3.1 are between −1.25 and 1.25. As also shown in FIG. 5, approximately 57.8% of the FER values corresponding to a mean opinion score of 3.1 are between 1.25 and 3.75. Thus, the FER values in the interval between −1.25 and 1.25 have a proportional weight of 6.8%, while the FER values in the interval between 1.25 and 3.75 have a proportional weight of 57.8%.

To determine which pilot signal strength values and FER are most likely to correspond to a discrete mean opinion score, the following equation is used:

$$\hat{\mu} = w_1 x_1 + w_2 x_2 + \ldots + w_n x_n$$

where $\hat{\mu}$ is the value of the transformed data (i.e., the value of FER or pilot signal strength that is most likely to correspond to a discrete mean opinion score), $w_1$-$w_n$ are the proportional weights of the histogram intervals, and $x_1$-$x_n$ are the midpoint values of the histogram intervals. Using the data in FIG. 5:

$$\hat{\mu} = 0*0.689 + 2.5*0.5780 + 5*0.2864 + 7.5*0.0251 + \ldots + 42.5*0.00095 \approx 3.74$$

Thus, for a mean opinion score of 3.1, the transformed FER data value is 3.74.

Figure 6:
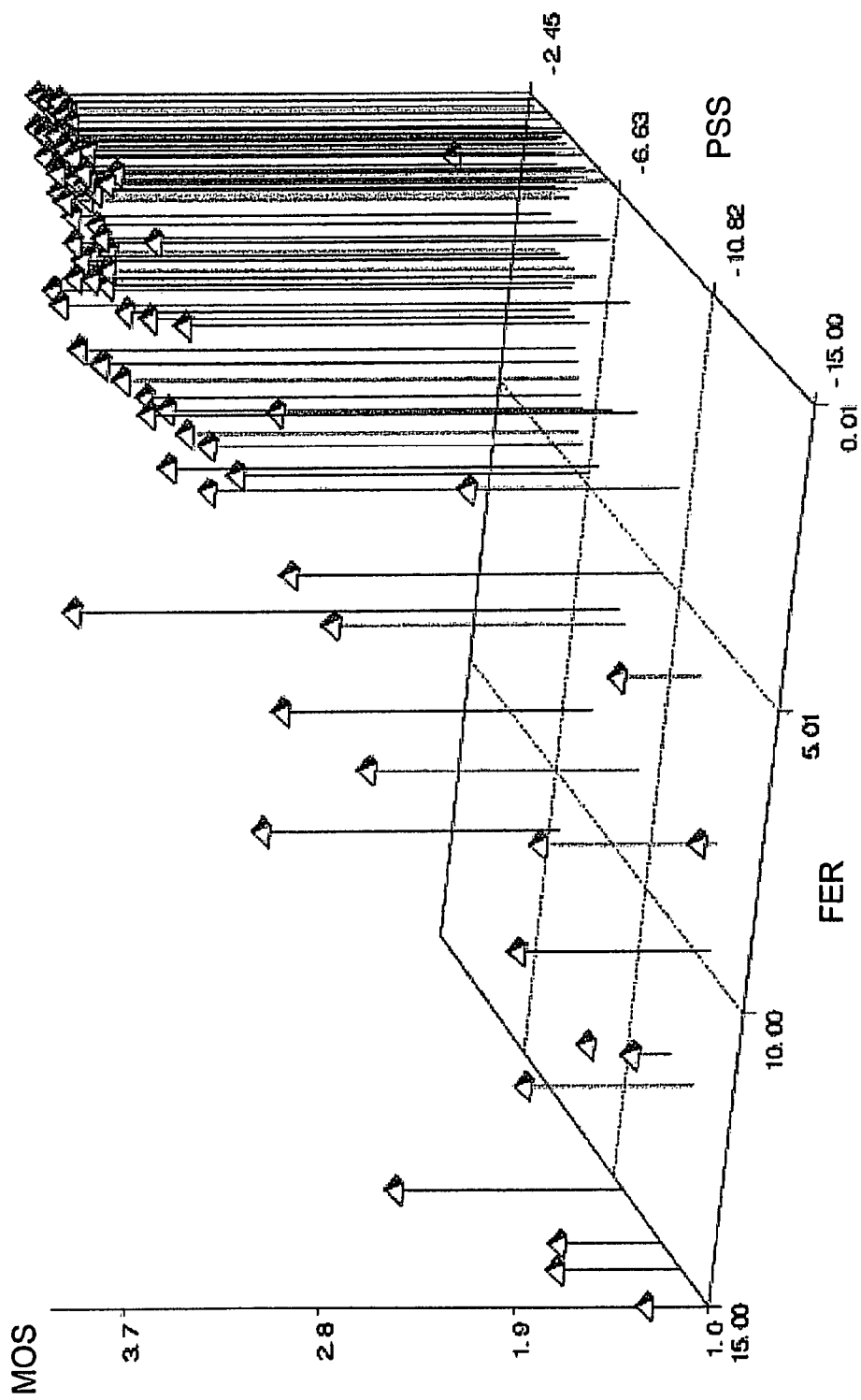
FIG. 6 is a three-dimensional plot depicting subjective mean opinion scores, transformed FER values, and transformed pilot signal strength values.
Figure 7:
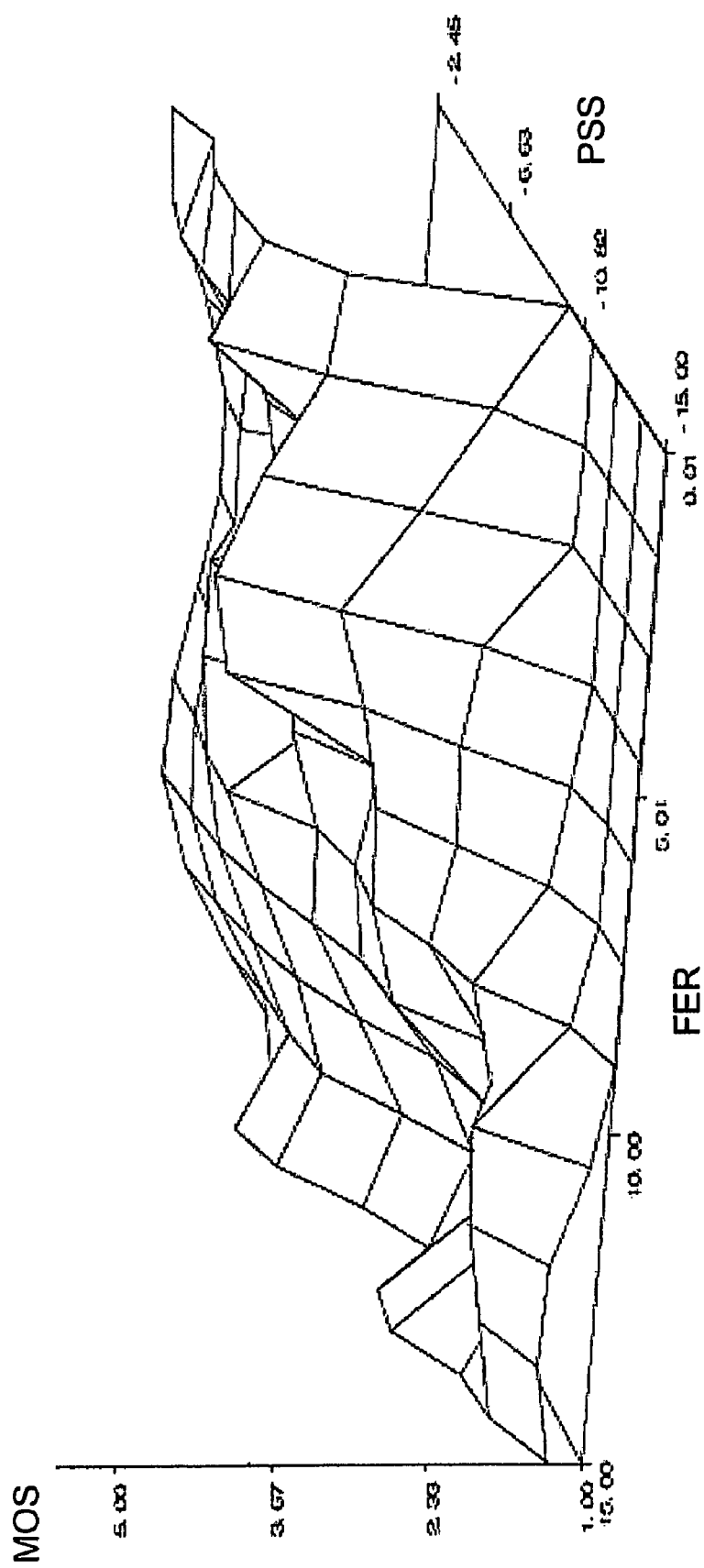
FIG. 7 is a surface plot depicting subjective mean opinion scores, transformed FER values, and transformed pilot signal strength values.

FIG. 6 is a three-dimensional plot of the subjective mean opinion scores plotted against the transformed FER values and the transformed pilot signal strength values, and FIG. 7 is a surface model of the three-dimensional plot in FIG. 6. Unlike FIG. 5, in which there was no readily identifiable pattern to the data, FIGS. 6 and 7 show a discernable harmonic pattern to the transformed data.

It should be understood that although the previous example involved using a weighted means method to transform the data, other methods of data transformation may be used as well. For example, the data may be transformed by selecting, for each discrete mean opinion score, the top 10% for FER and pilot signal strength values. As another example, the data may be transformed by selecting, for each discrete mean opinion score, the bottom 10% of FER and pilot signal strength values. Other data transformation techniques may be used as well.

Returning to FIG. 3, at step 306, after transforming the data, the entity may use a non-linear regression model to define an equation for the mean opinion score as a function of FER and pilot signal strength. One non-linear regression technique that may be used is a trigonometric regression.

Using a trigonometric regression, the equation for the mean opinion score as a function of FER and pilot signal strength takes the following form:

$$MOS = k + a*FER + b*PSS$$

$$+ C_{11}*\cos(2\pi*FER) + C_{21}*\cos(4\pi*FER) + C_{31}*\cos(6\pi*FER)$$

$$+ \ldots + S_{11}*\sin(2\pi*FER) + S_{21}*\sin(4\pi*FER) + S_{31}*\sin(6\pi*FER)$$

$$+ \ldots + C_{21}*\cos(2\pi*PSS) + C_{22}*\cos(4\pi*PSS) + C_{32}*\cos(6\pi*PSS)$$

$$+ \ldots + S_{12}*\sin(2\pi*PSS) + S_{22}*\sin(4\pi*PSS) + S_{32}*\sin(6\pi*PSS) +$$

where MOS is the predicted mean opinion score, FER is the frame error rate, and PSS is the pilot signal strength. k, a, b, $C_n$, and $S_n$ are constants.

The values of the constants are initially unknown. To calculate the values of the constants, the entity may use a statistical tool, such as the well-known Statistical Analysis Software ("SAS"), to calculate the values of the constants in the equation. Usually, the values of the constants are selected such that the equation best fits the transformed FER values, the transformed pilot signal strength values, and the subjective mean opinion scores.

Before determining the values of the constants, the entity should first scale the values of the transformed FER values and the transformed pilot signal strength values to be between 0 and 1, inclusive. This is because in a trigonometric regression the data must be proportional to $2\pi$ radians or 360 degrees. In order to scale the transformed FER values, the following equation is used:

$$FER_{scaled} = \frac{FER - FER_{min}}{FER_{max} - FER_{min}}$$

where FER is the transformed FER value being scaled, $FER_{max}$ is the maximum transformed FER value, and $FER_{min}$ is the minimum transformed FER value.

To scale the transformed pilot signal strength values, the following equation is used:

$$PSS_{scaled} = \frac{PSS - PSS_{min}}{PSS_{max} - PSS_{min}}$$

where PSS is the transformed pilot signal strength value being scaled, $PSS_{max}$ is the maximum transformed pilot signal strength value, and $PSS_{min}$ is the minimum transformed pilot signal strength value.

After scaling the transformed FER and transformed pilot signal strength values, the entity may use the transformed FER values, the transformed pilot signal strength values, and the received subjective mean opinion scores to determine the values of the constants.

In tests, the trigonometric regression equation generated accurate results and had an $R^2$ value generally over 0.90. $R^2$ is a number between 0 and 1 that is indicative of how closely the regression equation explains the data set. An $R^2$ of 1 indicates a perfect fit between the data and the regression. $R^2$ values are well known in statistics and are not discussed in detail here.

Figure 8:
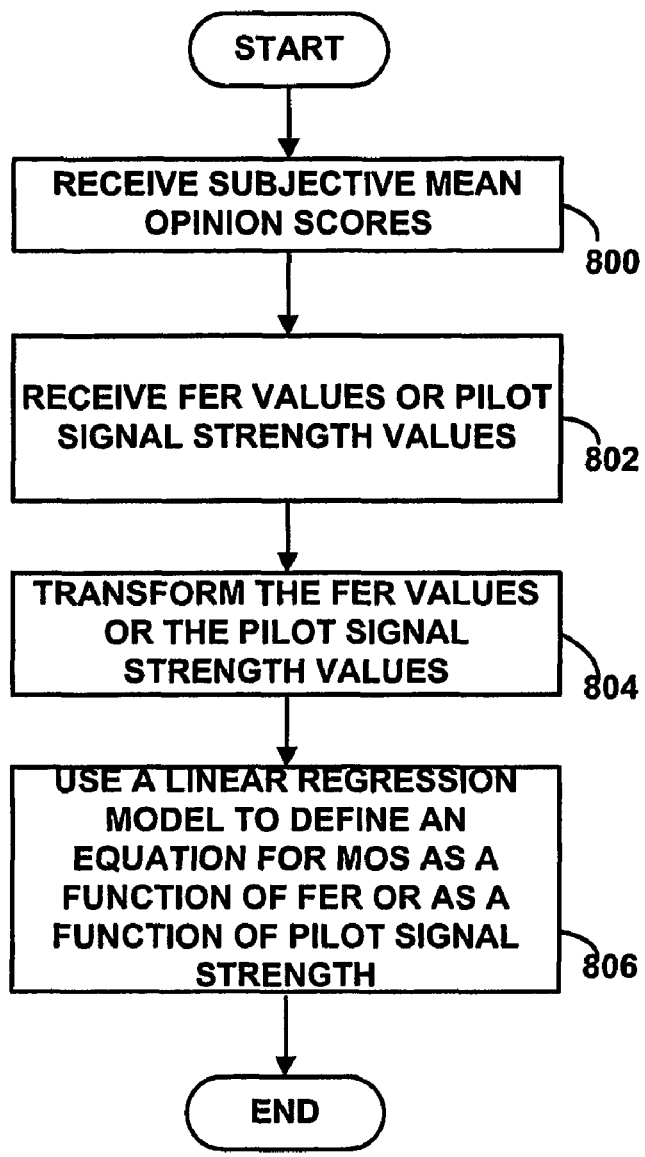
FIG. 8 is a flow chart depicting in summary a set of functions that can be carried out in accordance with an alternate embodiment.

FIG. 8 is a flow chart depicting in summary a set of functions that can be carried out in accordance with an alternate embodiment. Specifically, FIG. 8 depicts a method for calculating the mean opinion score as a linear function of FER or of pilot signal strength. As noted above, aspects of the method may be carried out by an entity/combination of entities such as a mobile station, a BSC, a centralized server, or some other entity. It should be understood that the linear regression model is not as robust as the non-linear regression model described above. However, the linear model is useful in situations where the entity does not have access to both FER and pilot signal strength values, or the entity is unable to calculate the values of the constants in the trigonometric regressions (i.e., because the entity is not equipped with a statistical tool such as SAS).

As shown in FIG. 8, at step 800, the entity receives subjective mean opinion scores for test calls. Next, at step 802, the entity receives FER or pilot signal strength values for the test calls.

Figure 9:
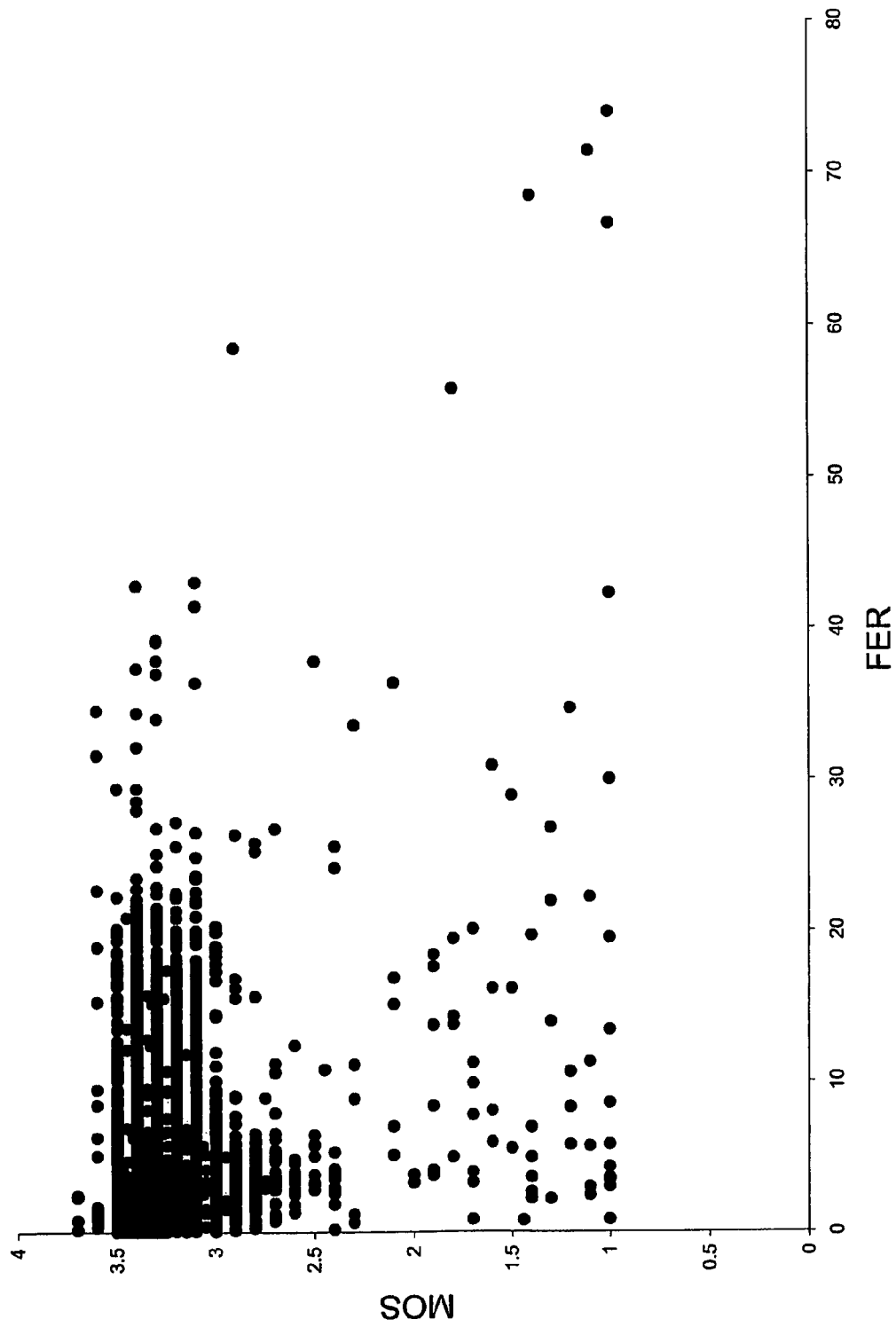
FIG. 9 is a two-dimensional plot depicting received subjective mean opinion scores versus received FER values.

FIG. 9 is a two-dimensional plot depicting the received subjective mean opinion scores versus the received FER values. As can be seen in FIG. 9, there does not appear to be any linear pattern in the data.

Figure 10:
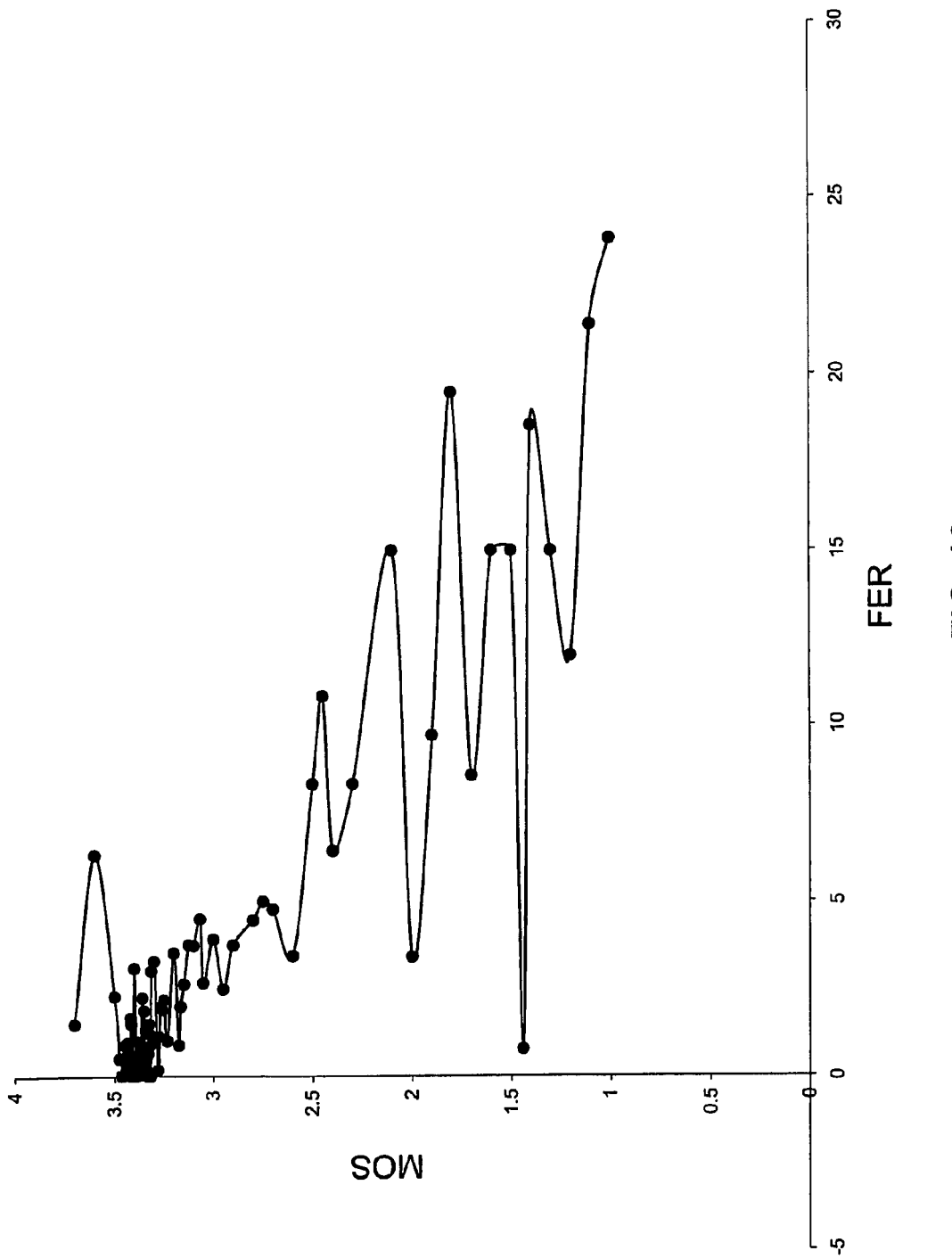
FIG. 10 is a two-dimensional plot depicting received subjective mean opinion scores versus transformed FER values.

At step 806, the entity applies a data transformation technique to the FER or pilot signal strength values in order to identify a pattern in the data. For example, the entity may select the top 10% of the FER or pilot signal strength values. Alternately, the entity may select the lowest 10% of the FER or pilot signal strength values. FIG. 10 is a two-dimensional plot depicting the received subjective mean opinion scores versus the transformed FER values (here, the top 10% received FER values). As can be seen in FIG. 10, the transformed data appears more linear in nature than the untransformed data in FIG. 9.

At step 806, after transforming the data, the entity may use a linear regression model to calculate the mean opinion score as a function of FER or as a function of pilot signal strength. If MOS is calculated as a function of FER, the equation is:

$$MOS = \alpha * FER + \beta$$

where $\alpha$ and $\beta$ are constants, and FER is the frame error rate. If MOS is calculated as a function of pilot signal strength, the equation is:

$$MOS = \alpha * PSS + \beta$$

where $\alpha$ and $\beta$ are constants, and PSS is the pilot signal strength.

The values of the constants are initially unknown, but may be calculated using SAS or any other tool capable of linear regression (such as Microsoft Excel).

Figure 11:
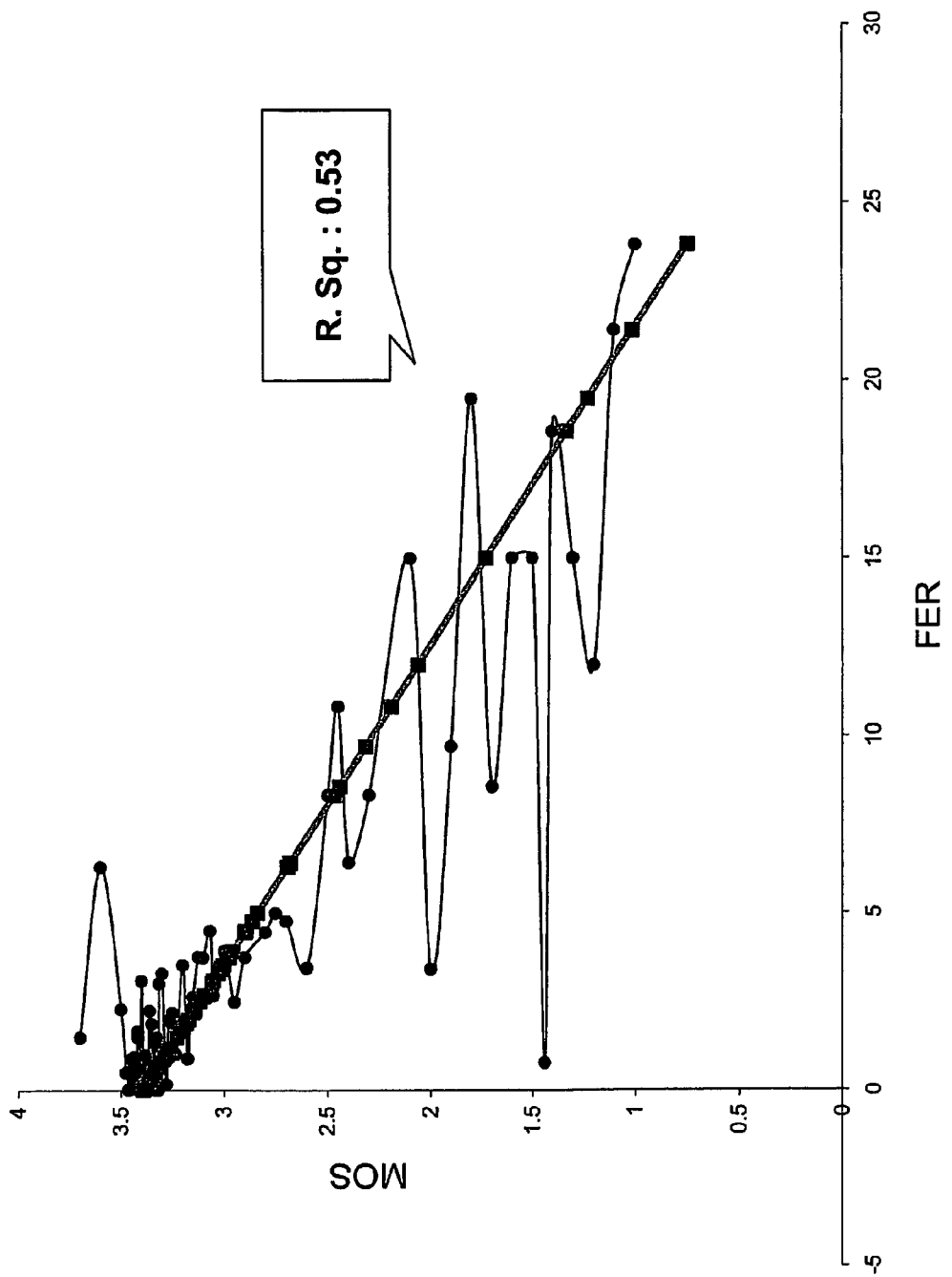
FIG. 11 is a two-dimensional plot depicting received subjective mean opinion scores versus transformed FER values, and a regression line.

FIG. 11 is a two-dimensional plot depicting the received subjective mean opinion scores versus the transformed FER values, and the calculated regression line. As can be seen in FIG. 11, the $R^2$ value of the regression is 0.53.

After obtaining the equation for the objective mean opinion score using the linear or non-linear regression model, the equation may be used to determine the audio fidelity of calls made within the network. For example, the entity may receive the FER and/or pilot signal strength values for a call made on the network and use those values in the equation to determine the objective mean opinion score for that specific call. In addition, a sector's average objective mean opinion score may be calculated by (1) obtaining FER and pilot signal strength values for calls made within that sector, (2) determining the average FER and pilot signal strength values, and (3) using the averaged FER and pilot signal strength values in the equation.

In addition, a sector's average mean opinion score could be compared against a threshold mean opinion score. In the event that the MOS scores fall below the threshold value (i.e., the MOS scores in the sector are unacceptable), the entity could be arranged to alert the network service provider. The service provider could then send maintenance teams to repair or upgrade the sector, so as to improve the FER and pilot signal strength values within the sector.

Embodiments of the invention have been described above. Those of ordinary skill in the art will appreciate, however, that modifications may be made while remaining within the scope of the invention as defined by the claims.

We claim:

1. A method to determine an audio fidelity of a call made on a cellular network, wherein the method is carried out by a radio access network (RAN) entity, the method comprising:
   the RAN entity receiving a first input, wherein the first input comprises a plurality of subjective mean opinion scores for a plurality of calls made on a network;
   the RAN entity receiving a second input, wherein the second input comprises a plurality of frame error rate values for the plurality of calls made on the network;
   the RAN entity receiving a third input, wherein the third input comprises a plurality of pilot signal strength values for the plurality of calls made on the network; transforming the plurality of frame error rate values, so as to create a plurality of transformed frame error rate values;
   the RAN entity transforming the plurality of pilot signal strength values, so as to create a plurality of transformed pilot signal strength values;
   the RAN entity using (i) the subjective mean opinion scores, (ii) the plurality of transformed pilot signal strength values, and (iii) the plurality of transformed frame error rate values in a non-linear regression to define an equation for an objective mean opinion score, wherein the objective mean opinion score is indicative of the audio fidelity of a call made on the network; and
   the RAN entity using the equation to calculate an objective mean opinion score for a call made on the network.

2. The method of claim 1, wherein the non-linear regression is a trigonometric regression.

3. The method of claim 1, wherein transforming the plurality of frame error rate values comprises using a weighted means method to determine which of the plurality of frame error rate values are most likely to correspond to a discrete subjective mean opinion score.

4. The method of claim 1, wherein transforming the plurality of pilot signal strength values comprises using a weighted means method to determine which of the plurality of pilot signal strength values are most likely to correspond to a discrete subjective mean opinion score.

5. The method of claim 1, wherein transforming the plurality of frame error rate values comprises selecting a highest ten percent of the plurality of frame error rate values.

6. The method of claim 1, transforming the plurality of pilot signal strength values comprises selecting a highest ten percent of pilot signal strength values.

7. The method of claim 1 wherein the plurality of pilot signal strength values are measured in terms of $E_c/I_0$.

8. The method of claim 1, wherein receiving the third input comprises receiving a plurality of pilot strength measurement messages.

9. The method of claim 1 further comprising the RAN entity comparing the calculated objective mean opinion score to a threshold value.

10. The method of claim 9, further comprising the RAN entity triggering an alert when the calculated objective mean opinion score is outside the threshold value.

11. A system comprising:
a communication interface;
a processor;
non-transitory data storage; and
program logic stored in the non-transitory data storage and executable by the processing unit to (i) receive a first input, wherein the first input comprises a plurality of subjective mean opinion scores for a plurality of calls made on a network, (ii) receive a second input, wherein the second input comprises a plurality of frame error rate values for the plurality of calls made on the network, (iii) receive a third input, wherein the third input comprises a plurality of pilot signal strength values for the plurality of calls made on the network, (iv) transform the plurality of frame error rate values, so as to create a plurality of transformed frame error rate values, and (v) transform the plurality of pilot signal strength values, so as to create a plurality of transformed pilot signal strength values;
wherein the program logic is further arranged to use a non-linear regression analysis to define an equation for an objective mean opinion score, wherein the objective mean opinion score is indicative of the audio fidelity of a call made on the network using (i) the subjective mean opinion scores, (ii) the plurality of transformed pilot signal strength values, and (iii) the plurality of transformed frame error rate values; and
wherein the program logic is further arranged to use the equation to calculate an objective mean opinion score for a call made on the network.

12. The system of claim 11, wherein the program logic is further arranged to use a weighted means method to transform the plurality of frame error rate values.

13. The system of claim 11, wherein the program logic is further arranged to use a weighted means method to transform the plurality of pilot signal strength values.

14. The system of claim 11, wherein the non-linear regression analysis is a trigonometric regression.

15. The system of claim 11, wherein program logic is further arranged select a highest ten percent of the plurality of pilot signal strength values in order to transform the plurality of pilot signal strength values.

16. The system of claim 11, wherein program logic is further arranged select a highest ten percent of the plurality of frame error rate values in order to transform the plurality of frame error rate values.

17. A method for determine an audio fidelity of a call made on a cellular network, wherein the method is carried out by a radio access network (RAN) entity, the method comprising:
the RAN entity receiving a first input, wherein the first input comprises a plurality of subjective mean opinion scores for a plurality of calls made on a network;
the RAN entity receiving a second input, wherein the second input comprises a plurality values selected from the group consisting of (i) frame error rate values for the plurality of calls made on the network and (ii) pilot signal strength values for the plurality of calls made on the network;
the RAN entity transforming the second input values, so as to create a plurality of transformed values;
the RAN entity using the subjective mean opinion scores and the plurality of transformed values in a linear regression to define an equation for an objective mean opinion score, wherein the objective mean opinion score is indicative of the audio fidelity of a call made on the network; and
the RAN entity using the equation to calculate an objective mean opinion score for a call made on the network.

18. The method of claim 17, wherein transforming the second input values comprises selecting a highest ten percent of the second input values.

19. The method of claim 17, wherein transforming the second input values comprises selecting a lowest ten percent of the second input values.

20. The method of claim 17, wherein the pilot signal strength values are measured in terms of $E_c/I_0$.

* * * * *